United States Patent
Ohashi et al.

(10) Patent No.: US 8,916,634 B2
(45) Date of Patent: Dec. 23, 2014

(54) MASTER BATCH, METHOD OF PRODUCING THE SAME AND METHOD OF MOLDING ARTICLES THEREOF

(75) Inventors: Kazuaki Ohashi, Kanagawa (JP); Anzu Kasai, Kanagawa (JP); Daisuke Hiratsuka, Osaka (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 0 days.

(21) Appl. No.: 12/866,595

(22) PCT Filed: Feb. 26, 2009

(86) PCT No.: PCT/JP2009/053557
§ 371 (c)(1),
(2), (4) Date: Aug. 6, 2010

(87) PCT Pub. No.: WO2009/107719
PCT Pub. Date: Sep. 3, 2009

(65) Prior Publication Data
US 2011/0003924 A1 Jan. 6, 2011

(30) Foreign Application Priority Data
Feb. 29, 2008 (JP) ................................ 2008-050981

(51) Int. Cl.
*C08K 5/04* (2006.01)
*C08J 3/22* (2006.01)
*C08K 5/098* (2006.01)
*C08L 23/02* (2006.01)

(52) U.S. Cl.
CPC ............... *C08J 3/226* (2013.01); *C08K 5/098* (2013.01); *C08J 2423/00* (2013.01); *C08L 23/02* (2013.01)
USPC .......................................... 524/394; 524/398

(58) Field of Classification Search
USPC ........................................................ 524/394
See application file for complete search history.

(56) References Cited

U.S. PATENT DOCUMENTS

2007/0225409 A1  9/2007  Matsumoto

FOREIGN PATENT DOCUMENTS

| JP | 06-287355 | 10/1994 | | |
|---|---|---|---|---|
| JP | 9-75434 | 3/1997 | | |
| JP | 9-188778 | 7/1997 | | |
| JP | 9-286817 | 11/1997 | | |
| JP | 09286817 A | * 11/1997 | ............... | C08F 8/44 |
| JP | 2001-048992 | 2/2001 | | |
| JP | 2005-048145 | 2/2005 | | |
| JP | 2005048145 A | * 2/2005 | ............. | C09D 17/00 |
| JP | 2006-109902 | 4/2006 | | |
| JP | 2007-231035 | 9/2007 | | |
| WO | 2006/080319 | 8/2006 | | |

OTHER PUBLICATIONS

Translation of JP 2005-048145, Feb. 2005.*
Translation of JP 09-286817, Nov. 1997.*
Aoki et al., Electrochimica Acta, vol. 52, issue 7, pp. 2485-2491, 2007.*
Cao et al., Chinese Journal of Inorganic Chemistry, vol. 23, No. 5, pp. 907-910, May 31, 2007.*
Lee et al., J. Phys. Chem. B 106, 2892-2900, 2002.*
Cao Jing et al., "Synthesis and Characterization of Fibrous Silver Stearate", Chinese Journal of Inorganic Chemistry, vol. 23, No. 5 , May 31, 2007, pp. 907-910.
Seung Joon Lee et al., "Structure and Thermal Behavior of a Layered Silver Carboxylate ", The Journal of Physical Chemistry B, vol. 106, No. 11, Feb. 27, 2002, pp. 2892-2900.
China Office action, dated Mar. 29, 2013 along with an english translation thereof.
Kato H et al., "Master Batch Composition for Molding Comprises a Thermoplastic Resin, a Filter, a Stabilization Assistant e.g. Fatty Acid, Metal Salt of Fatty Acid, and an Antistatic Agent e.g. Quaternary Ammonium Salt ", WPI/Thomson, Feb. 20, 2001, XP002463658.
Search report from E.P.O., mail date is Nov. 15, 2012.
Korea Office action in Korean Appln No. 10-2010-7018895, mail date is Jun. 25, 2014.

* cited by examiner

*Primary Examiner* — Hui Chin
(74) *Attorney, Agent, or Firm* — Greenblum & Bernstein, P.L.C.

(57) ABSTRACT

A master batch for use in forming ultrafine metal particles serving as an adsorptive material, a method of producing the same, and a method of molding an article containing ultrafine metal particles by using the master batch. The master batch comprises a thermoplastic resin and a metal organoate contained therein, the metal of the metal organoate being selected from the group consisting of Cu, Ag, Au, In, Pd, Pt, Fe, Ni, Co, Zn, Nb, Sn, Ru and Rh. Adsorption performance is not expressed by the master batch but is expressed by an article molded by blending the resin with the master batch.

3 Claims, No Drawings

MASTER BATCH, METHOD OF PRODUCING THE SAME AND METHOD OF MOLDING ARTICLES THEREOF

TECHNICAL FIELD

This invention relates to a master batch, a method of producing the same, and a method of molding articles blended with the master batch. Particularly, the invention relates to a master batch for an adsorptive resin composition and to a method of producing the same. More specifically, the invention relates to a master batch which, in the state of the master batch, does not express adsorption performance but expresses the adsorption performance in the state of being added to the resin and is molded, and to a method of producing the same.

BACKGROUND ART

There have heretofore been proposed a variety of deodorants and adsorbents capable of adsorbing offensively smelling components such as methyl mercaptans or volatile organic compounds (hereinafter "VOC") such as formaldehydes and the like, usually, by using porous substances, such as active carbon, silica gel, zeolite, etc.

There have, further, been proposed various deodorants or adsorbents being added to thermoplastic resins which are molded into articles to impart thereto the performance for adsorbing the above components. For example, a patent document 1 described below is disclosing inorganic fillers such as active carbon, porous zeolite and sepiolite, or titanium oxide utilizing photo-catalytic action, which are capable of counteracting a wide range of smelling components and having heat resistance enabling themselves to be melt-mixed with the thermosetting resins.

There has, further, been proposed a deodorant using ultrafine metal particles, such as a deodorant using, as an effective component, a colloidal solution of ultrafine metal particles obtained by reducing, for example, a metal ion-containing solution (patent document 2).

However, the deodorants utilizing a porous substance exhibit their adsorption effect (deodorizing effect) upon adsorbing smelling components or VOC, and are accompanied by a problem in that their effect extinguishes if the adsorption sites are saturated. Further, in order to improve dispersion property, the inorganic filler must use a dispersant at the time when it is melt-kneaded with a thermoplastic resin. Therefore, there remains a problem in that the adsorption sites in the surfaces of the inorganic filler are covered with the resin or the dispersant causing the adsorption effect to decrease conspicuously.

Further, the deodorant utilizing the photo-catalytic action has a problem in that the surface of the titanium oxide must have been irradiated with ultraviolet rays at all times to decompose and deodorize the smelling components.

Moreover, if the deodorant containing ultrafine metal particles is added to the resin, then the resin is decomposed due to the ultrafine metal particles having a high surface activity, and the moldability is greatly impaired and, besides, a dispersion solution is necessary from the standpoint of handling. Therefore, the deodorant cannot be favorably added to the resin.

From the above points of view, the present inventors have attempted to make the organic acid component present on the surfaces of the ultrafine metal particles to decrease the direct contact between the metal surface and the resin, to effectively suppress the decomposition of the resin, and have thus proposed ultrafine adsorptive metal particles that suppress a decrease in the molecular weight of the resin and that do not impair the moldability (patent document 3).

Patent document 1: JP-A-9-75434
Patent document 2: JP-A-2006-109902
Patent document 3: WO2006/080319

DISCLOSURE OF THE INVENTION

Problems that the Invention is to Solve

To blend a resin with the above-mentioned adsorptive materials, it is a general practice to prepare a master batch that contains the adsorptive substances at high concentrations, and add the master batch to the resin. Namely, prior to molding a desired article, the resin and the adsorptive materials are kneaded together so that the adsorptive materials are dispersed in the resin in order to facilitate the step of molding the articles and to improve the dispersion of the adsorptive materials in the resin. In particular, when the above ultrafine metal particles are used as the adsorptive material, their very large surface areas prevent the ultrafine metal particles from being homogeneously dispersed. Besides, since the ultrafine metal particles alone can be handled with difficulty, use of the master batch is particularly effective in molding a desired article.

These adsorptive materials, however, adsorb smelling components even in the state of the master batch arousing such a problem that the article molded by blending a resin with the master batch has a decreased amount of adsorption. This problem becomes conspicuous when the above ultrafine metal particles are used as the adsorptive material because of its high adsorptive ability.

Through the repetition of heating, further, the ultrafine metal particles in the resin tend to be aggregated or grow. Therefore, the step of forming the master batch by conducting the kneading with the resin under heated condition becomes a cause of lowering the adsorption performance of the final product or the molded article.

According to the present invention, the adsorption performance is not expressed by the master batch but is expressed by a molded article obtained by blending a resin with the master batch. The object of the present invention, therefore, is to provide a master batch used for forming ultrafine metal particles that serve as an adsorptive material and a method of producing the same.

Another object of the invention is to provide a method of producing a molded article in which the ultrafine metal particles of the adsorptive material are homogeneously dispersed in the resin by using the master batch.

According to the present invention, there is provided a master batch for use in forming ultrafine metal particles, comprising a thermoplastic resin and a metal organoate contained therein, the metal of the metal organoate being selected from the group consisting of Cu, Ag, Au, In, Pd, Pt, Fe, Ni, Co, Zn, Nb, Sn, Ru and Rh.

In the master batch of the present invention, it is desired that:
1. The metal is at least Ag;
2. A difference is less than 0.1 between a maximum value and a minimum value of peak height of absorbance over plasmon absorption wavelengths of 300 to 700 nm;
3. The organic acid is a fatty acid;
4. The fatty acid has 3 to 30 carbon atoms; and
5. The thermoplastic resin is a polyolefin resin.

According to the present invention, further, there is provided a method of producing the master batch by kneading the thermoplastic resin and the metal organoate at a temperature at which the metal organoate is not thermally decomposed in the resin.

According to the present invention, further, there is provided a method of molding an article in which ultrafine metal particles are dispersed, by blending the thermoplastic resin with the master batch, and heating and kneading the mixture thereof at a temperature at which the metal organoate can be thermally decomposed in the resin but which is lower than a temperature at which the thermoplastic resin is thermally deteriorated.

In the molding method of the present invention, it is desired that the ultrafine metal particles have an average particle diameter of 1 to 100 nm.

The adsorptive ultrafine metal particles proposed above by the present inventors have a bond between the organic acid component and the metal, and have an infrared absorption peak near 1518 $cm^{-1}$ stemming from the bond between the organic acid component and the metal. The adsorptive ultrafine metal particles have a high surface activity and large surface areas, react excellently with smelling components, VOC or very small proteins, exhibit adsorption rates and adsorption amounts larger than those of the ordinary particles, express excellent adsorption effect, and have organic acid components on the surfaces of the ultrafine metal particles. Therefore, the metal surfaces are little brought into direct contact with the resin, effectively suppressing the decomposition of the resin and suppressing a decrease in the molecular weight of the resin. Therefore, the moldability is not impaired.

The feature of the present invention resides in that the metal organoate that can be formed into the ultrafine metal particles is added to the master batch as a precursor of the fine metal particles in the thermoplastic resin. In the state of the master batch, the metal organoate does not almost express adsorption performance.

The master batch of the invention is added to the resin which is, then, molded under a heated condition into an article permitting the ultrafine metal particles having an average particle diameter of 1 to 100 nm to be homogeneously dispersed in the resin. Thus, the ultrafine metal particles express adsorption performance to a conspicuous degree in the state where they are dispersed in the resin, i.e., in the state of being molded into an article. Therefore, the master batch of the present invention is capable of controlling the expression of adsorption performance.

In the master batch of the present invention, it is desired that a difference is less than 0.1 between a maximum value and a minimum value of peak height of absorbance over plasmon absorption wavelengths of 300 to 700 nm. That is, if the metal organoate is assuming the form of ultrafine metal particles and is homogeneously dispersed in the resin, can be confirmed by the presence of plasmon absorption by the ultrafine metal particles. In the master batch of the present invention, the difference which is less than 0.1 between a maximum value and a minimum value of peak height of absorbance over the above range, makes it possible to confirm that the metal of the metal organoate is not assuming the form of the ultrafine metal particles that express adsorption performance.

The peak height of absorbance referred to in this specification stands for a height of peak of absorbance from the base line when both hems of the peak of absorbance over the plasmon absorption wavelengths of 300 to 700 nm are drawn to the straight line, and the average particle diameter stands for an average value of the particles presuming that the particles have no gap among themselves.

EFFECTS OF THE INVENTION

The master batch of the present invention does not almost express by itself the adsorption performance for the offensively smelling components or VOC. Therefore, the adsorption performance of the molded article such as a finally molded article or a secondarily molded article is not affected by aging, such as preservation, management, distribution or the like of the master batch, enabling the molded article to express adsorption performance maintaining stability.

Further, the master batch of the invention contains the metal organoate that serves as a precursor of ultrafine metal particles dispersed in the resin. Therefore, the ultrafine metal particles are more homogeneously dispersed in the molded article than those of the article molded by heating the resin which is directly blended with the metal organoate. Accordingly, excellent adsorption performance is expressed.

MODE FOR CARRYING OUT THE INVENTION (Metal Organoates)

The metals of the metal organoates used in the master batch of the invention are selected from the group consisting of Cu, Ag, Au, In, Pd, Pt, Fe, Ni, Co, Zn, Nb, Ru and Rh. Among them, Au, Ag, Cu, Pt and Sn are preferred and, particularly, Ag is preferred. These metal components may be used in one kind, or a plurality of metal salts may be used in combination. If they can be synthesized, further, they may be used as a composite metal organoate.

As the organic acids for the metal organoates used in the present invention, there can be exemplified aliphatic carboxylic acids such as myristic acid, stearic acid, oleic acid, palmitic acid, n-decanoic acid, paratoluic acid, succinic acid, malonic acid, tartaric acid, malic acid, glutaric acid, adipic acid and acetic acid; aromatic carboxylic acids such as phthalic acid, maleic acid, isophthalic acid, terephthalic acid, benzoic acid and naphthenic acid; and alicyclic carboxylic acid such as cyclohexanedicarboxylic acid.

In the present invention, the organic acid that is used is, particularly desirably, a higher fatty acid having 3 to 30 carbon atoms as represented by myristic acid, stearic acid and palmitic acid. By using those having large number of carbon atoms, further, the organic acid components themselves can adsorb smelling components or VOC to further improve the adsorption effect (deodorizing effect).

Though there is no particular limitation, it is desired that the metal organoates that are used have an average particle diameter in a range of 1 to 100 μm and, particularly, 20 to 50 μm and a water content of not larger than 200 ppm from the standpoint of obtaining a molded article having favorable adsorption performance.

(Thermoplastic Resins)

For the master batch of the present invention, there can be used any known thermoplastic resins that can be melt-molded as the thermoplastic resins for containing metal organoates. For example, there can be used olefin resins such as low-, intermediate- or high-density polyethylene, linear low-density polyethylene, linear ultra-low-density polyethylene, isotactic polypropylene, syndiotactic polypropylene, propylene/ethylene copolymer, polybutene-1, ethylene/butene-1 copolymer, propylene/butene-1 copolymer and ethylene/propylene/butene-1 copolymer; polyester resins such as polyethylene terephthalate, polybutylene terephthalate and polyethylene naphthalate; polyamide resins such as nylon 6, nylon 6,6 and nylon 6,10; and polycarbonate resin. Polyethylene and polypropylene are particularly preferably used.

(Master Batch)

It is desired that the master batch of the present invention, though not limited thereto only, comprises the thermoplastic resin and the above metal organoate contained therein in an amount of 0.1 to 50 parts by weight and, particularly, 1 to 10 parts by weight per 100 parts by weight of the resin. If the amount is smaller than the above range, the adsorption performance cannot be sufficiently imparted to the article that is molded by being blended with the master batch. If the amount is larger than the above range, on the other hand, the metal organoate aggregates making it difficult to adjust the average particle diameter of the metal organoate to lye in a range of 1 to 200 μm.

The master batch of the present invention can be prepared by heating and mixing the thermoplastic resin and the metal organoate and, particularly, the metal organoate having an average particle diameter of 1 to 100 μm at a temperature higher than a melting point of the thermoplastic resin but at which the metal organoate does not thermally decompose in the resin.

The temperature at which the metal organoate does not thermally decompose is a temperature lower than a temperature at which the metal organoate starts decomposing. In practice, however, the temperature is affected by the heat of shearing due to the screw or the residence time in addition to the setpoint temperature of the extruder. It is, therefore, important to adjust the working conditions such as residence time, heating time, rotational speed of the screw, etc. so that the metal organoate is not decomposed.

The heating conditions necessary for preparing the master batch vary depending upon the metal organoate that is used, and cannot be definitely defined. Usually, however, the heating is conducted at a temperature of 130 to 220° C. and, particularly, 140 to 200° C. for 1 to 1800 seconds and, particularly, 5 to 300 seconds.

Though not limited thereto only, the thermoplastic resin and the metal organoate are homogeneously mixed, first, by using a mixer such as tumbler blender, Henschel's mixer or super mixer, and are melt-kneaded and granulated by using a mono-axial extruder or a multi-axial extruder. Or, the thermoplastic resin and the metal organoate are melt-kneaded by using a kneader or Bumbury's mixer, and are granulated by using an extruder.

Depending upon the use, the master butch may be blended with various blending agents known per se., such as filler, plasticizer, leveling agent, viscosity-imparting agent, viscosity-reducing agent, stabilizer, antioxidant and ultraviolet ray absorber according to known recipe.

(Adsorptive Molded Articles)

A molded article obtained by blending the thermoplastic resin with the master batch of the invention and heating and mixing them together, contains the ultrafine metal particles having an average particle diameter of 1 to 100 nm homogeneously dispersed therein, and expresses excellent adsorption performance.

That is, upon blending the thermoplastic resin with the master batch of the invention and heating and mixing them together, fine metal particles contained in the master batch turn into ultrafine metal particles and are homogeneously dispersed in the thermoplastic resin making it possible to obtain an adsorptive molded article in which ultrafine metal particles having an average particle diameter of 1 to 100 nm are dispersed. It is, further, desired that the heating and mixing for molding are conducted at a temperature at which the metal organoate thermally decomposes in the resin but is lower than a temperature at which the thermoplastic resin thermally deteriorates.

The temperature at which the metal organoate thermally decomposes may be higher than a temperature at which the metal organoate starts decomposing but does not necessarily have to be higher than the temperature at which the metal organoate starts decomposing. As described above, the temperature is affected by the heat of shearing due to the screw of a biaxial extruder or by the residence time. Upon adjusting the working conditions such as residence time and heating time in the biaxial extruder, rotational speed of the screw, etc., therefore, the metal organoate is decomposed to form ultrafine metal particles.

The temperature at which the metal salt of fatty acid starts decomposing referred to here is a temperature at which the fatty acid moiety starts splitting or decomposing from the metal moiety as is specified under the JIS K 7120 according to which a mass of an organic compound (metal salt of fatty acid) is measured to conduct the thermogravimetry for measuring a change in the weight when the temperature is elevated in an inert atmosphere by using a thermogravimetric device. The temperature at which the decomposition starts is calculated from a thermogravimetric curve (TG curve) obtained through the measurement. The temperature is defined to be a starting temperature at a point where a tangent on a maximum gradient between the bending points on the TG curve intersects a line which is in parallel with an axis of abscissa passing through a mass of before starting the test heating.

The temperature for concretely molding a resin article varies depending upon the molding method, thermoplastic resin that is used, kind of the metal organoate and average particle diameter of ultrafine metal particles in the master batch, and cannot be definitely defined. Generally, however, the temperature for molding the resin articles is 120 to 230° C. and, particularly, 160 to 220° C., and the heating is conducted for 1 to 1800 seconds and, particularly, 5 to 300 seconds.

The amount of the ultrafine metal particles added to the thermoplastic resin varies depending upon the content of the metal organoate in the master batch, required adsorption performance, use and shape of the molded article. Usually, however, the ultrafine metal particles are contained in an amount of 0.0001 to 5 parts by weight per 100 parts by weight of the thermoplastic resin from the standpoint of dispersion of the ultrafine metal particles.

The thermoplastic resin to which the master batch is to be added may be the thermoplastic resin used for forming the master batch and is, desirably, a thermoplastic resin having an oxygen permeation coefficient of not less than $1.0 \times 10^{-4}$ cc·m/m$^2$·day·atm. This enables the adsorptive ultrafine metal particles to easily adsorb smelling components or VOC and to, further, improve the adsorption performance.

Depending on the use, further, there can be added various blending agents known per se., such as filler, plasticizer, leveling agent, viscosity-imparting agent, viscosity-reducing agent, stabilizer, antioxidant and ultraviolet absorber according to known recipe like the preparation of the master batch.

The adsorptive molded article obtained by using the master batch of the invention can be subjected to a known melt molding such as two-roll method, injection molding, extrusion molding or compression molding to finally obtain the adsorptive (deodorizing) resin-molded articles in shapes that meet the use, such as granules, pellets, films, sheets, containers, building materials, wall papers, etc.

The ultrafine metal particles in the articles molded by using the master batch of the present invention, desirably, have a maximum diameter of not larger than 1 µm and an average particle diameter, particularly, in a range of 1 to 100 nm.

EXAMPLES

1. Confirming the Plasmon Absorption by Using a Spectrophotometer and a Difference in the Peak Height of Absorbance The master batch and a film containing metal particles comprising the master batch were measured for their absorbances by using a spectrophotometer (UV-3100PC manufactured by Shimazu Seisakusho Co.) to make sure the presence of plasmon absorption over 300 to 700 nm, and a difference between a maximum value and a minimum value of peak height of absorbance over the above wavelengths was calculated. Since the master batch was of a particulate shape, the thermoplastic resin was hot-pressed at a temperature higher than the melting point of the thermoplastic resin but lower than the heat decomposition temperature of the metal organoate to form a sheet having a thickness of 50 µm for easy measurement. The spectral transmission factor of the sheet as measured by using the spectrophotometer was regarded as the absorbance of the master batch.

2. Measuring the Methyl Mercaptane Concentration of when not Deodorized

By using a micro syringe, 5 µL of an offensively smelling substance, methyl mercaptane, was injected into a 500-mL glass bottle (manufactured by GL-Science Co.) purged with a nitrogen gas and sealed for its mouth portion with a rubber plug, and was left to stand for a whole day at room temperature (25° C.). After left stand for a whole day, a detector tube (manufactured by Gas-Tech Co.) was inserted in the bottle to measure the concentration of the remaining methyl mercaptane, which was regarded as the methyl mercaptane concentration (A) of when not deodorized.

3. Measuring the Methyl Mercaptane Concentration after Deodorized (1) Master Batch.

0.5 Gram of the master batch was weighed and was put into the 500-mL glass bottle purged with the nitrogen gas, and the glass bottle was sealed with the rubber plug. Thereafter, by using the micro syringe, 5 µL of the offensively smelling substance, methyl mercaptane, was injected therein so that its concentration in the bottle was adjusted to be 10 ppm, and was left to stand a whole day at room temperature (25° C.). After left to stand for a whole day, the detector tube (manufactured by Gas-Tech Co.) was inserted in the bottle to measure the concentration of the remaining methyl mercaptane, which was regarded as the methyl mercaptane concentration (B) after deodorized.

(2) Metal Particle-Containing Film that is Secondarily Molded.

The metal particle-containing film was cut into a square each side measuring 5 cm, and was hung in the 500-mL glass bottle by using a resin thread. Next, the glass bottle purged with the nitrogen gas was sealed and, thereafter, 5 µL of the offensively smelling substance, methyl mercaptane, was injected therein by using the micro syringe so that its concentration in the bottle was adjusted to be 10 ppm, and was left to stand a whole day at room temperature (25° C.). After left to stand for a whole day, the detector tube (manufactured by Gas-Tech Co.) was inserted in the bottle to measure the concentration of the remaining methyl mercaptane, which was regarded as the methyl mercaptane concentration (C) after deodorized.

4. Calculating the Ratio of Methyl Mercaptane Deodorization

A value obtained by subtracting the methyl mercaptane concentration (B) or (C) from the methyl mercaptane concentration (A) of when not deodorized, was multiplied by 100 and was expressed as the deodorization ratio in percentage.

Example 1

3 Kilograms of a low-density polyethylene resin was blended with 5% by weight of a silver stearate, and the mixture was thrown into a resin throw port of a biaxial extruder, extrusion-molded therein at a temperature of 140° C. which was not lower than a melting point of the resin but lower than a temperature at which the silver stearate starts thermally decomposing, and was extruded therefrom to obtain a master batch.

Next, the plasmon absorption of the obtained master batch was confirmed by using the spectrophotometer, a difference in the peak height of absorbance was calculated, and the ratio of methyl mercaptane deodorization was calculated.

Example 2

A master batch was prepared in the same manner as in Example 1 but containing 2% by weight of the silver stearate, and measurement and calculation were conducted.

Example 3

A master batch was prepared in the same manner as in Example 1 but throwing the silver stearate through a cylinder positioned near the ejection port, and measurement and calculation were conducted.

Example 4

A master batch was prepared in the same manner as in Example 3 but containing 2% by weight of the silver stearate, and measurement and calculation were conducted.

Example 5

A master batch was prepared in the same manner as in Example 1 but using a silver myristate, and measurement and calculation were conducted.

Comparative Example 1

A master batch was prepared in the same manner as in Example 1 but conducting the extrusion molding at 240° C. which was not lower than a temperature at which the metal organoate starts thermally decomposing, and measurement and calculation were conducted.

Comparative Example 2

A master batch was prepared in the same manner as in Example 1 but using the silver myristate and conducting the extrusion molding at 260° C. which was not lower than a temperature at which the metal organoate starts thermally decomposing, and measurement and calculation were conducted.

Example 6

The master batches prepared in Example 1 were stored for 1, 2 and 3 months in an environment of room temperature of 37° C. and a humidity of 50%, and were mixed and blended with the low-density polyethylene at a ratio of low-density polyethylene:master batch=9:1. The mixtures were extrusion molded in the biaxial extruder at 200° C. and were extruded to prepare three kinds of metal particle-containing films having a thickness of 50 μm. By using these films, the methyl mercaptane concentrations were measured after the deodorization, and the ratios of deodorization were calculated.

Example 7

A metal particle-containing film was prepared in the same manner as in Example 6 but using the master batch prepared in Example 2 and mixing and blending it at such a ratio that the low-density polyethylene:master batch=3:1, and measurement and calculation were conducted.

Example 8

A metal particle-containing film was prepared in the same manner as in Example 6 but using the master batch prepared in Example 3, and measurement and calculation were conducted.

Example 9

A metal particle-containing film was prepared in the same manner as in Example 6 but using the master batch prepared in Example 4, and measurement and calculation were conducted.

Example 10

A metal particle-containing film was prepared in the same manner as in Example 6 but using the master batch prepared in Example 5 and mixing and blending it at such a ratio that the low-density polyethylene:master batch=3:1, and measurement and calculation were conducted.

Comparative Example 3

A metal particle-containing film was prepared in the same manner as in Example 6 but using the master batch prepared in Comparative Example 1 and mixing and blending it at such a ratio that the low-density polyethylene:master batch=9:1, and measurement and calculation were conducted.

Comparative Example 4

A metal particle-containing film was prepared in the same manner as in Comparative Example 3 but using the master batch prepared in Comparative Example 2, and measurement and calculation were conducted.

The results were as shown in Table 1 and Table 2.

TABLE 1

| | Fine particles | Content | Molding temp. | Throwing position | Plasmon absorption | Difference in the peak height of absorbance | *3 | *4 | Deodorizing ratio |
|---|---|---|---|---|---|---|---|---|---|
| Ex. 1 | silver stearate | 5 | 140° C. | *1 | no | 0 | 13ppm | 9ppm | 31% |
| Ex. 2 | silver stearate | 2 | 140° C. | *1 | no | 0 | 13ppm | 10ppm | 23% |
| Ex. 3 | silver stearate | 5 | 140° C. | *2 | no | 0 | 13ppm | 8ppm | 38% |
| Ex. 4 | silver stearate | 2 | 140° C. | *2 | no | 0 | 13ppm | 9ppm | 31% |
| Ex. 5 | silver myristate | 5 | 140° C. | *1 | no | 0 | 13ppm | 9ppm | 31% |
| Comp. Ex. 1 | silver stearate | 5 | 240° C. | *1 | yes | 0.34 | 13ppm | 3ppm | 77% |
| Comp. Ex. 2 | silver myristate | 5 | 260° C. | *1 | yes | 0.25 | 13ppm | 3.5ppm | 73% |

*1: resin throwing port
*2: in front of ejection port
*3: Methyl mercaptane concentration before deodorized
*4: Methyl mercaptane concentration after deodorized

TABLE 2

| | Master batch | Mixing ratio (base material/MB) | Molding temp. | Plasmon absorption | *1 | *2 | *3 | *4 |
|---|---|---|---|---|---|---|---|---|
| Ex. 6 | product of Example 1 | 9:1 | 200° C. | yes | 13ppm | 99% | 99% | 99% |
| Ex. 7 | product of Example 2 | 3:1 | 200° C. | yes | 13ppm | 99% | 99% | 99% |
| Ex. 8 | product of Example 3 | 9:1 | 200° C. | yes | 13ppm | 99% | 99% | 99% |
| Ex. 9 | product of Example 4 | 3:1 | 200° C. | yes | 13ppm | 99% | 99% | 99% |
| Ex. 10 | product of Example 5 | 9:1 | 200° C. | yes | 13ppm | 99% | 99% | 99% |

TABLE 2-continued

|  | Master batch | Mixing ratio (base material/MB) | Molding temp. | Plasmon absorption | *1 | *2 | *3 | *4 |
|---|---|---|---|---|---|---|---|---|
| Comp. Ex. 3 | Product of Comp. Ex. 1 | 9:1 | 200° C. | yes | 13ppm | 99% | 88% | 77% |
| Comp. Ex. 4 | Product of Comp. Ex. 2 | 9:1 | 200° C. | yes | 13ppm | 99% | 88% | 77% |

*1: Methyl mercaptane concentration before deodorization
*2: Deodorization ratio after master batch was preserved for 1 month
*3: Deodorization ratio after master batch was preserved for 2 months
*4: Deodorization ratio after master batch was preserved for 3 months As will be obvious from the Examples, the deodorizing ratios of the master batches of Examples 1 to 5 are smaller than those of Comparative Examples 1 and 2, telling that the master batches do not almost express adsorption performance by themselves.

Further, the films containing ultrafine metal particles of Examples 6 to 10 using the master batches of Examples 1 to 5 have high deodorization ratios expressing excellent adsorption performance, whereas the metal organoate-containing films of Comparative Examples 3 and 4 using the master batches of Comparative Examples 1 and 2 have low deodorization ratios.

In Examples 1 to 5 dealing with the master batches of the invention and in Examples 6 to 10, therefore, no adsorption performance is expressed by the master batches but the adsorption performance is expressed by the molded articles containing the master batches, the expression of adsorption performance being controllable.

In Comparative Examples, on the other hand, the temperature at which the thermoplastic resin and the metal organoate are heated and kneaded for producing the master batch, is a temperature at which the metal organoate is thermally decomposed in the thermoplastic resin. Therefore, ultrafine metal particles are formed in the master batch and, therefore, the adsorption performance is expressed by the master batch.

Industrial Applicability

The master batch according to the present invention does not express performance for adsorbing offensively smelling components and VOC. Therefore, the adsorption performance of the molded article such as the finally molded article or the secondarily molded article is not affected by aging, such as preservation, management, distribution, etc. of the master batch, and excellent adsorption performance can be imparted to the molded article such as the finally molded article or the secondarily molded article. The obtained molded article can be efficiently produced into such forms as particles, pellets, fibers, films, sheets and containers, and can be utilized in a variety of fields of industries.

In the master batch of the present invention, further, the metal organoate which is a precursor of the ultrafine metal particles is dispersed in the resin. Therefore, the ultrafine metal particles are more homogeneously dispersed in the molded article than in the molded article that is heat-molded by directly blending the resin with the metal organoate. It is, therefore, made possible to efficiently provide molded articles having excellent adsorption performance.

The invention claimed is:

1. A master batch for forming ultrafine metal particles, the master batch being obtained by heating and mixing an olefin resin that contains a metal organoate at a temperature at which the metal organoate is not thermally decomposed, the metal of said metal organoate being at least one selected from the group consisting of Cu, Ag, Au, In, Pd, Pt, Fe, Ni, Co, Zn, Nb, Sn, Ru and Rh and at least including silver, and wherein the metal organoate is made from a fatty acid and has not been thermally decomposed, wherein a difference is less than 0.1 between a maximum value and a minimum value of peak height of absorbance over plasmon absorption wavelengths of 300 to 700 nm.

2. The master batch according to claim 1, wherein said fatty acid has 3 to 30 carbon atoms.

3. The master batch according to claim 1, wherein said olefin resin is a polyolefin resin.

* * * * *